United States Patent
Marrone

(10) Patent No.: US 11,511,248 B2
(45) Date of Patent: Nov. 29, 2022

(54) METHOD FOR CONTROLLING A VIBRATING PRILLING BUCKET IN A UREA PRILLING PROCESS

(71) Applicant: Casale SA, Lugano (CH)

(72) Inventor: Leonardo Marrone, Mercallo (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 17/763,400

(22) PCT Filed: Sep. 1, 2020

(86) PCT No.: PCT/EP2020/074359
§ 371 (c)(1),
(2) Date: Mar. 24, 2022

(87) PCT Pub. No.: WO2021/058242
PCT Pub. Date: Apr. 1, 2021

(65) Prior Publication Data
US 2022/0331765 A1 Oct. 20, 2022

(30) Foreign Application Priority Data
Sep. 24, 2019 (EP) .................................. 19199166

(51) Int. Cl.
*B01J 2/18* (2006.01)
*B01J 2/02* (2006.01)

(52) U.S. Cl.
CPC .. *B01J 2/18* (2013.01); *B01J 2/02* (2013.01)

(58) Field of Classification Search
CPC ....... B01J 2/18; B01J 2/02; B01J 2/04; C05G 5/12; C05C 9/00
See application file for complete search history.

(56) References Cited

U.S. PATENT DOCUMENTS

| 4,585,167 A | 4/1986 | Kholin |
| 6,062,487 A | 5/2000 | Bedetti |
| 2017/0274336 A1* | 9/2017 | Rizzi ......................... B01J 2/04 |

FOREIGN PATENT DOCUMENTS

| EP | 0233384 A2 | 8/1987 |
| EP | 1624957 A1 | 2/2006 |

(Continued)

OTHER PUBLICATIONS

International Search Report dated Dec. 1, 2020 issued in connection with PCT/EP2020/074359.

(Continued)

*Primary Examiner* — Mary Lynn F Theisen
(74) *Attorney, Agent, or Firm* — Akerman LLP

(57) ABSTRACT

A method for controlling a prilling bucket in the prilling of a a urea melt (UM) including: feeding the urea melt to a prilling bucket (1) which vibrates under the action of a magnetostrictive device (2), wherein the vibration of the bucket is controlled, as a function of the amount of urea melt to be prilled, by the following steps: acquisition of a time-varying input signal (3) which represents the flow rate of urea melt fed to the prilling bucket; generation of a first signal (5) and of a second signal (6), independently from each other, as a function of said input signal (3); generation of a third signal (10) having a frequency which is modulated by said first signal and an magnitude which is modulated by said second signal, and use of said third signal to drive said magnetostrictive device (2).

14 Claims, 1 Drawing Sheet

(56) References Cited

FOREIGN PATENT DOCUMENTS

EP          2008709 A1    12/2008
WO    2018/164652 A1    9/2018

OTHER PUBLICATIONS

Written Opinion of the International Searching Authority dated Dec. 1, 2020 issued in connection with PCT/EP2020/074359.
International Preliminary Report on Patentability dated Jan. 26, 2022 issued in connection with PCT/EP2020/074359.
Sklabinskiy, Vsevolod et al., "Improving of the Electronic Intellectual Cleaning System of Holes in Perforated Shells of the Priller," 2019 IEEE International Conference on Modern Electrical and Energy Systems, Sep. 23, 2019, pp. 70-73.
Artyukhov, Artem et al., "Electrical Intelligent System for Controlling the Formation of Monodisperse Droplets in Granulation Devices Based on Magnetostrictive Actuator," 2017 International Conference on Modern Electrical Energy Systems, IEEE, Nov. 15, 2017, pp. 280-283.
Braghin et al., "A Linear Model of Magnetostrictive Actuators for Active Vibration Control," Mechanical Engineering Department, presented at the 8th International Conference on Computing, Communications and Control Technologies (CCCT 2010).

\* cited by examiner

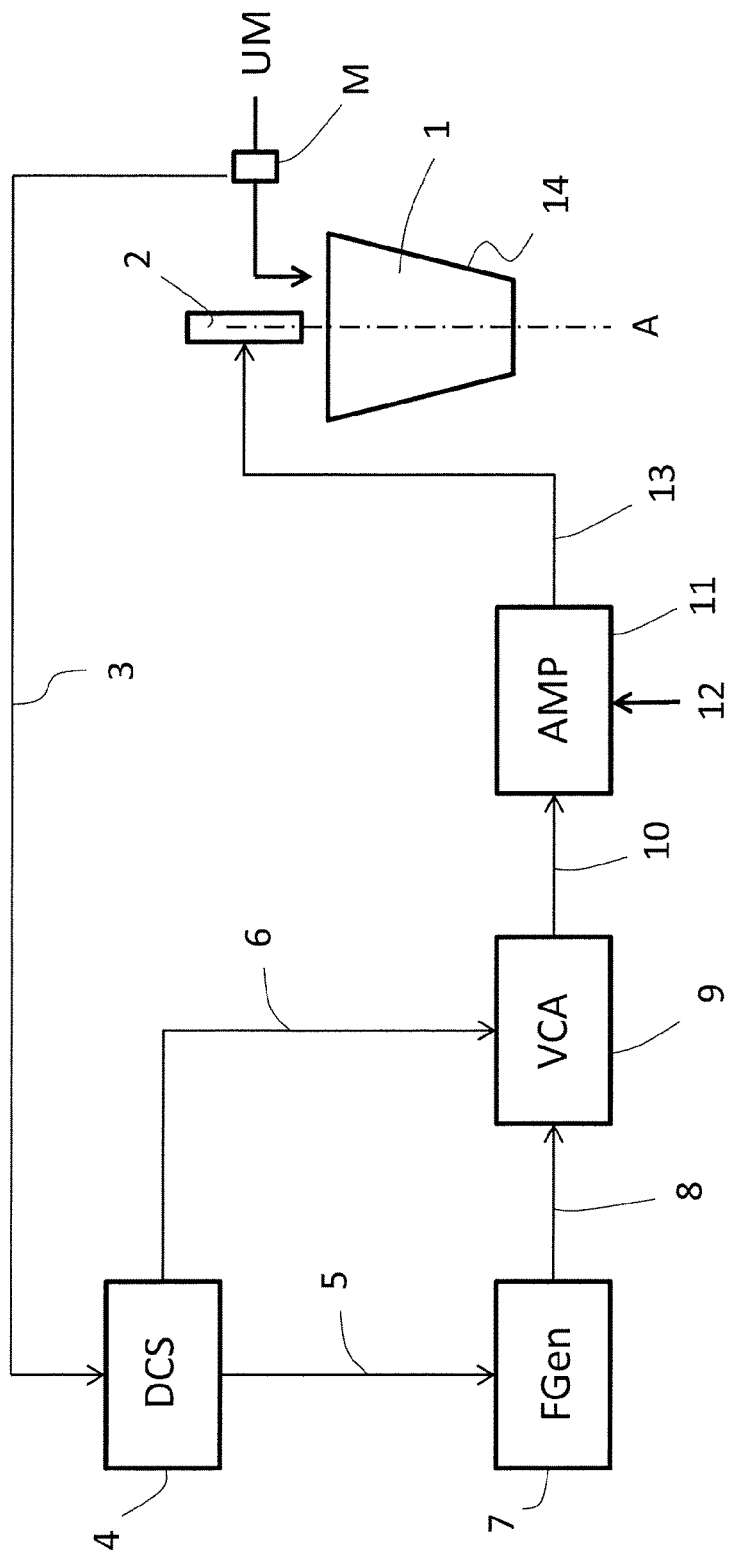

METHOD FOR CONTROLLING A VIBRATING PRILLING BUCKET IN A UREA PRILLING PROCESS

CROSS-REFERENCE TO RELATED APPLICATIONS

This application is a national phase of PCT/EP2020/074359, filed Sep. 1, 2020, and claims priority to EP 19199166.0, filed Sep. 24, 2019, the entire contents of both of which are hereby incorporated by reference.

FIELD OF THE INVENTION

The invention relates to the prilling of urea, particularly to the control of a prilling bucket used in the finishing of urea.

PRIOR ART

In a urea synthesis process, urea is synthesized starting from ammonia and carbon dioxide. In most urea plants, an aqueous solution of urea is produced in a urea synthesis section; this solution is then processed in one or more recovery sections to remove unconverted matter, mostly in the form of ammonium carbamate, and obtain a solution of urea and water with as low as possible contaminants and unconverted matter.

In a finishing section for the production of solid urea, water is removed from this purified urea solution to form a highly concentrated urea melt.

A known technique for converting the urea melt into solid urea is the prilling process where small drops of the urea melt fall from top of a prilling tower in counter-current with cooling air, and solidified drops of urea are collected at the bottom of the tower.

A first challenge of this process is how to generate suitable droplets of urea from an input feed of urea melt. Regardless of the technique for its production, the droplets will be statistically dispersed around an average size, leading to a certain dispersion of the size of the solid product around a desired size, for example granules of 2 mm diameter. A large dispersion means that a considerable fraction of the solid product may be beyond acceptability (either because the granules are too large or too small). There is therefore the need to produce a flow of droplets with as low as possible dispersion. Ideally, a flow of particles having the same size is called a monodisperse flow.

A technique for producing the droplets is to feed the urea melt to a fast rotating bucket with a perforated side wall. Said bucket is installed on top of a prilling tower and rotates around a vertical axis; accordingly the liquid is ejected from the perforated side wall in the form of small droplets. In an effort to approach the monodisperse flow, it has been found that vibrating the bucket vertically along to the axis of rotation is advantageous because the vibration helps break the liquid jets (ejected from the fast rotating perforated bucket) into small and uniform droplets.

Vibrating and rotating prilling buckets are described in the prior art. For example, EP 1 624 957 discloses a vibrating prilling bucket and EP 2 008 709 discloses an improvement wherein only the side wall of the bucket is vibrated to reduce the vibrating mass and related inertial stress.

A more recent development of vibrating prilling buckets is the use of a magnetostrictive device as a vibration engine. A magnetostrictive device includes a magnetostrictive element which changes its length due to its magnetization. By applying a proper (in terms of frequency and magnitude) time-varying electrical current, this device can therefore deliver a mechanical vibration at defined frequency and amplitude. The use of a magnetostrictive engine appears promising to replace mechanical or pneumatic vibrators due to its extremely precise control of the vibration.

Still another challenge relates to the control of the vibration of the prilling bucket. The frequency and amplitude of the vibration should be regulated according to the processed flow rate of urea melt which may be subject to change or fluctuations. Among others, the urea melt flow rate may vary because a portion of the urea is sent to a different use, such as the production of melamine or of a diesel exhaust fluid (DEF), i.e. a solution of urea and water for the catalytic reduction of NOx.

The current magnetostriction-based systems rely on manual adjustment of a power supply of the magnetostrictive device. This power supply is generally installed in the prilling tower close to the bucket, to minimize the distance of transmission and related distortion. This local manual control however cannot follow properly and timely a change or fluctuation of the urea melt flow rate. A vibration not properly adjusted result in a greater dispersion of the liquid droplets.

SUMMARY OF THE INVENTION

The invention aims to overcome the above limitations. Particularly, the invention aims to solve the problem of how to provide accurate and continuous control of the vibration of a magnetostrictive vibrating prilling bucket, depending of the amount of urea melt processed in the bucket itself.

This aim is reached with a method for controlling a prilling bucket in a urea melt prilling process according to claim 1.

In the method of the invention, a urea melt input flow is fed to a vibrating prilling bucket and the vibration of said bucket is caused by a magnetostrictive device. The vibration of the bucket is controlled, as a function of the rate of said input flow of urea melt, by the following steps:

acquisition of a time-varying input signal which represents the time-varying flow rate of urea melt fed to the prilling bucket;

generation of a first signal and of a second signal, independently from each other, as a function of said input signal;

generation of a third signal, which is harmonic, having a frequency which is modulated by said first signal and magnitude which is modulated by said second signal, and use of said third signal to drive said magnetostrictive device.

The generation of said third signal may include the following steps: the first signal is fed to a function generator; said function generator outputs a harmonic signal with a given magnitude and a frequency modulated with the first signal; said output signal of said function generator and the second signal are fed to a voltage controlled amplifier (VCA) wherein the magnitude (e.g. voltage) of the signal from the function generator is modulated with said second signal, this producing an output signal of said VCA which constitutes the above mentioned third signal.

The method may include amplification of the third signal prior to its use to drive the magnetostrictive device.

The term magnitude may be referred indifferently to current and/or voltage.

The term of harmonic signal denotes a sinusoidal signal.

In a preferred embodiment, the third signal is the source signal of a power amplifier connected to a power source or grid, and said power amplifier outputs a drive signal, which results from amplification of the above mentioned third signal. The drive signal drives the magnetostrictive device.

In a preferred application, the frequency of vibration of the vibrating bucket is controlled in a range from 0 up to 1000 Hz. Accordingly the frequency of the third signal is in the same range of 0 to 1000 Hz. More preferably, for most applications of urea prilling, the frequency of the mechanical vibration, and therefore the frequency of said third signal, is in a range of 200 to 1000 Hz.

In practice, the frequency of said third signal gives the frequency of vibration of the magnetostrictive device and, therefore, of the vibration of the prilling bucket. Preferably the frequency of said third signal is an increasing function of the flow rate within a given control range of the flow rate. That is to say, the greater is the flow rate, the greater is the frequency. In a preferred embodiment, the relationship between the frequency and the flow rate is linear or substantially linear. The term substantially linear denotes that the relationship deviates from linearity by not more than 20% in the control range. The control range denotes the interval from minimum flow rate to maximum flow rate where the control of vibration is performed.

The amplitude of the mechanical vibration (i.e. the displacement underwent by the magnetostrictive device and transmitted to the vibrating bucket) may also be an increasing function of the flow rate. However it may be preferable to keep a constant or substantially constant amplitude of vibration irrespective of the flow rate. Accordingly, an embodiment of the invention includes that the magnitude of the third signal is controlled in such a way that the amplitude of the mechanical vibration imparted to the prilling bucket is constant or substantially constant with respect to the flow rate.

It has to be noted that a constant amplitude of the mechanical vibration may not correspond to a constant magnitude of the third signal (in terms of voltage), due to the frequency variation of the electrical impedance of the magnetostrictive device.

The first and the second signal may be analog signals within a given range, e.g. from 0 to 5 V. The input signal, which represents the instant flow rate of urea melt directed to the prilling bucket, may be a conventional 4-20 mA signal.

The method of the invention in advantageously integrated in the distributed control system (DCS) of a urea plant. Particularly, a DCS of a urea plant may be fed with the input signal of the flow rate to the prilling bucket, and may be used to provide the above mentioned first signal and second signal. Normally, said DCS also governs the process of production of the urea melt by controlling items like compressors, pumps, valves, etc.

Accordingly, the invention can be put into practice by implementation of the method in a DCS of a urea plant when the urea plant includes a prilling tower.

According to various embodiments, the whole body of the prilling bucket, or only a side wall thereof, may vibrate under the action of the magnetostrictive device.

The invention also relates to a system for controlling a vibrating prilling bucket according to the claims. A system according to the invention can be integrated in a system for control of a urea process. For example, in an embodiment, the above mentioned DCS is also configured to control a process of production of the urea melt.

Another aspect of the invention is a process of urea prilling with a vibrating prilling bucket, wherein the vibration of the bucket is controlled according to the inventive method.

The invention is also applicable to revamping. A control system according to the invention can be applied to an existing prilling bucket in the context of revamping and modernizing the prilling tower of a urea plant.

The invention has the advantage that the vibration of the prilling device can be continuously controlled to follow the urea melt flow. The system reacts real-time to a change in the flow rate and adjusts the amplitude and/or frequency of the vibration accordingly. Thanks to this more accurate control, the dispersion of the droplets of urea melt ejected by the prilling bucket is reduced, which means a more uniform and more valuable solid product.

DESCRIPTION OF FIGURES

FIG. 1 is a block scheme of an embodiment of the invention.

DESCRIPTION OF A PREFERRED EMBODIMENT

FIG. 1 is a scheme of a system for controlling the vibration of a prilling bucket 1 which is installed in a urea prilling tower (not shown).

The prilling bucket 1 is fed with urea melt UM. In use, the bucket 1 rotates around an axis A and vibrates according to said axis A, which is a vertical axis, thanks to a magnetostrictive actuator 2.

The speed of rotation is normally set to about 150 to 200 rpm. The speed of rotation may also vary depending on the flow rate of the urea melt UM.

The magnetostrictive actuator 2 is connected to the prilling bucket 1 so that, when the actuator 2 is energized, the vibration of the actuator 2 is transmitted to vibrating parts of said bucket 1. The vibrating parts of the bucket 1 may include the perforated side surface 14 and possibly other parts.

Suitable magnetostrictive actuators are available from TdVib LLC, Iowa, US.

A suitable metering device M measures the flow rate (e.g. kg/s or m3/h) of the urea melt UM and provides a signal 3, which for example a 4-20 mA signal, to a DCS system 4. Said DCS system 4 may be installed on a suitable hardware in a control room of the urea plant which includes the above mentioned urea prilling tower where the bucket 1 is installed.

The DCS system 4 outputs a first analog signal 5 and a second analog signal 6. Both are for example 0 to 5 V.

The first signal 5 feeds a function generator (FGen) 7 which outputs a harmonic (i.e. sinusoidal) signal 8 having a constant magnitude, for example 1 Vrms, and a frequency in a given range, for example 0 to 1 kHz, which is modulated according to the feed signal 5.

A device suitable as function generator 7 is for example the model HMF2550 from the manufacturer Rohde&Schwarz.

The harmonic signal 8 now described and the second signal 6 from the DCS 4 feed a voltage controlled amplifier (VCA) denoted by the block 9.

Said VCA 9 modulates the magnitude of the harmonic signal 8 according to the signal 6. Therefore, the output of the VCA 9 is a harmonic signal 10 whose frequency depends on the control signal 5 and whose magnitude (e.g. voltage) depends on the control signal 6.

The VCA 9 may include, preferably, the chipset THAT 2162 from That Corporation, US.

The signal 10 is the source signal (e.g. 0 to 1 Vrms) of the amplifier and power generator 11 which is connected to a suitable power input 12 e.g. to the grid. The amplifier and power generator 11 gives a drive signal 13 (e.g. 0 to 130 Vrms) which keeps the input frequency and has the magnitude proportional to the one of signal 10. This signal 13 drives the magnetostrictive device 2.

As amplifier and power generator 11, the model Titan-Mac01 from Compact Power Co. may be used. It has to be noted that said amplifier and power generator 11 actually delivers the power necessary to drive the device 2.

The invention reaches the above mentioned aim of providing a real-time control of the vibration depending on the flow rate UM of urea melt. The drive signal of the magnetostrictive device 2 is continuously adjusted depending on the flow rate of urea melt which is acquired by means of the signal 3.

In use, the frequency of the mechanical vibration of the bucket 1 is equal to the frequency of signals 8, 10 and 13, in the range of practical interest (e.g. up to 1000 Hz).

The magnitude of the signal, for a target amplitude of vibration shall be calculated taking into account the impedance of the system. For example, given a target amplitude of the mechanical vibration, the corresponding magnitude of the signal 13 can be calculated by solving the system of the two dynamical equations of mechanics and electrics across the system.

A useful model of a magnetostrictive actuator is described in: Braghin F, Cinquemani S, Resta F: "A Linear Model of Magnetostrictive Actuators for Active Vibration Control", presented at the 8th International Conference on Computing, Communications and Control Technologies (CCCT 2010).

Alternatively the relationship between the magnitude of signal 13 and the amplitude of vibration can be defined experimentally.

The following is an example. A prilling bucket processes a flow rate ranging from 15 mtph (metric tons per hour) to 45 mtph of urea melt. The frequency of vibration is controlled in a range from about 400 Hz at the smallest flow rate to about 900 Hz at the maximum flow rate. The frequency increases almost linearly according to the flow rate. The amplitude of the mechanical vibration imparted to the prilling bucket is between 10 and 15 microns and remains substantially constant with respect to the flow rate. The speed of rotation is also controlled ranging from 180 rpm at low flow rate to 200 rpm at the maximum flow rate.

What is claimed is:

1. A method for controlling a prilling bucket in a urea melt prilling process, wherein:
    an input flow of urea melt (UM) is processed by said prilling bucket;
    the prilling bucket rotates around a vertical axis and vibrates along said axis;
    the vibration of said bucket is caused by a magnetostrictive device,
    wherein the method includes that the vibration of the bucket is controlled, as a function of the rate of said input flow (UM), by the following steps:
    acquisition of a time-varying input signal which represents the time-varying flow rate of urea melt fed to the prilling bucket;
    generation of a first signal and of a second signal, independently from each other, as a function of said input signal;
    generation of a third signal, which is a harmonic signal, having a frequency which is modulated by said first signal and a magnitude which is modulated by said second signal, and
    use of said third signal to drive said magnetostrictive device.

2. The method according to claim 1, wherein the generation of said third signal includes:
    the first signal is sent to a function generator;
    said function generator outputs a harmonic signal with a given magnitude and a frequency modulated with the first signal;
    said output signal of said function generator and the second signal are fed to a voltage controlled amplifier wherein the magnitude of the signal from the function generator is modulated with the second signal, so that said amplifier outputs the third signal.

3. The method according to claim 2, including amplification of the third signal prior to its use to drive the magnetostrictive device.

4. The method according to claim 3, wherein the third signal is the source signal of a power amplifier connected to a power source or grid, and said power amplifier outputs a drive signal of the magnetostrictive device.

5. The method according to claim 1, wherein the frequency of the third signal is in the range up to 1000 Hz.

6. The method according to claim 5, wherein the frequency of the third signal is in the range of 200 to 1000 Hz.

7. The method according to claim 1, wherein the frequency of said third signal, and therefore the frequency of vibration of the prilling bucket, is an increasing function of the flow rate within a control range of the flow rate.

8. The method according to claim 1, wherein the magnitude of the third signal is controlled in such a way that the amplitude of the mechanical vibration imparted to the prilling bucket is constant or substantially constant with respect to the flow rate.

9. The method according to claim 8, wherein the magnitude of the third signal is controlled in such a way that the amplitude of the mechanical vibration imparted to the prilling bucket is between 10 and 15 microns.

10. The method according to claim 1, wherein the first signal and the second signal are generated by a distributed control system (DCS).

11. The method according to claim 10, wherein the DCS also governs a process of production of the urea melt.

12. The method according to claim 1, wherein only a side wall of the prilling bucket vibrates.

13. A system for controlling a vibrating prilling bucket in a prilling tower of a urea finishing section of a urea plant, the system being configured to implement the method of claim 1, wherein the prilling bucket comprises a magnetostrictive actuator and the system includes:
    a distributed control system (DCS) arranged to receive an input signal of the flow rate of urea melt which is fed to the prilling bucket, and configured to output a first signal and a second signal;
    a function generator which is fed with the first signal from the DCS and outputs a signal with a given magnitude and a frequency modulated with said first signal;
    a voltage controlled amplifier (VCA) which is configured to modulate the output of said function generator with the second signal, thus obtaining a third signal;
    a power amplifier, connected to a power source or grid, which amplifies the third signal to obtain a drive signal for the actuator of the prilling bucket.

14. A process of urea prilling with a prilling bucket, comprising:
- feeding an input flow of urea melt (UM) to said prilling bucket;
- rotating the prilling bucket around a vertical axis and vibrating said bucket along said axis;
- wherein the vibration of said bucket is caused by a magnetostrictive device, controlling the vibration of the bucket, as a function of the rate of said input flow (UM), by the following steps:
- acquisition of a time-varying input signal which represents the time-varying flow rate of urea melt fed to the prilling bucket;
- generation of a first signal and of a second signal, independently from each other, as a function of said input signal;
- generation of a third signal, which is a harmonic signal, having a frequency which is modulated by said first signal and an magnitude which is modulated by said second signal, and
- use of said third signal to drive said magnetostrictive device.

\* \* \* \* \*